United States Patent [19]

Krauss

[11] Patent Number: 5,127,137
[45] Date of Patent: Jul. 7, 1992

[54] UNIVERSAL SWIVEL SNAP HOOK ASSEMBLY

[75] Inventor: Mark J. Krauss, East Greenwich, R.I.

[73] Assignee: American Cord & Webbing Co., Inc., Woonsocket, R.I.

[21] Appl. No.: 690,815

[22] Filed: Apr. 24, 1991

[51] Int. Cl.⁵ .................. A44B 11/00; A44B 13/02
[52] U.S. Cl. .................. 24/265 R; 24/265 H; 24/318
[58] Field of Search ............ 24/265 H, 265 R, 599.1, 24/600.2, 601.2, 318, 319, 165, 197, 199, 453

[56] References Cited

U.S. PATENT DOCUMENTS

| 229,348 | 6/1880 | Witter | 24/265 H |
|---|---|---|---|
| 406,188 | 7/1889 | Andress | 24/599.1 |
| 1,947,394 | 2/1934 | Heinze | 24/318 |
| 2,230,070 | 1/1941 | Wilhelm | 24/318 |
| 2,765,510 | 10/1956 | Rightor, Jr. et al. | 24/186 |
| 3,748,700 | 7/1973 | Willey | 24/453 |
| 4,577,374 | 3/1986 | Lii | 24/265 H |
| 4,868,954 | 9/1989 | Kasai | 24/265 H |

FOREIGN PATENT DOCUMENTS

| 2269311 | 11/1975 | France | 24/265 H |
|---|---|---|---|
| 0066775 | 1/1928 | Sweden | 24/600.1 |

Primary Examiner—Victor N. Sakran
Attorney, Agent, or Firm—Kane, Dalsimer, Sullivan, Kurucz, Levy, Eisele and Richard

[57] ABSTRACT

A universal swivel hook includes a U-shaped member with a bowed base to resist longitudinal forces from a web, and a hook arrangement coupled to the U-shaped member for connection to a hoop. The hook and U-shape member are connected to allow swiveling along two orthogonal axes. The U-shaped member also includes stop to limit the longitudinal movement of the web to avoid bunching of the web.

16 Claims, 2 Drawing Sheets

UNIVERSAL SWIVEL SNAP HOOK ASSEMBLY

BACKGROUND OF THE INVENTION a. Field of Invention

This invention pertains to a swivel hook assembly for securing webbing or the like to rings or other hooks, and more particularly to swivel hook arrangement which permits relative rotation between the webbing and the rings along at least two orthogonal axes.

b. Description of the Prior Art

Swivel hooks are known in the art which include a rectangular frame formed of a rigid U-shaped member on three sides with a bar pivotally mounted between the arms thereof. A hook was then rotatably mounted on the center bar. The elements of the hooks were molded from a plastic material. However, it was found that this arrangement was unsatisfactory because under heavy loads, the arms of the U-shaped member had a tendency to separate thereby freeing the bar. In addition, the web tended to bunch up at the corners of the U-shaped member so that the swivel hook was difficult to handle. Moreover, the hook itself tended to break.

OBJECTIVES AND SUMMARY OF THE INVENTION

In view of the above-mentioned disadvantages of the prior art, it is an objective of the present invention to provide an improved swivel hook assembly which can withstand larger loads without breaking.

Further objective is to provide an assembly which was easily used because the web could be trained therethrough without interference.

Other objectives and advantages of the invention shall become apparent from the following description. Briefly, a universal swivel hook assembly includes a swivel hook assembly comprising: web engaging means for engaging a flat web, said web engaging means including a first elongated member for entraining by said web, said elongated member being bowed outwardly in an area corresponding to the center of said web; hook means; and coupling means pivotally attaching said hook means to said web engaging means.

DETAILED DESCRIPTION OF THE INVENTION

Figure 1:
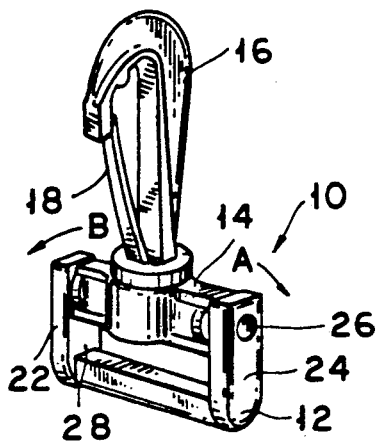
FIG. 1 shows a perspective view of a prior art swivel hook assembly constructed.

Referring now to the FIG. 1, a prior art swivel hook 10 includes, as described above, a frame having a U-shaped member 12 which is pivotally coupled to a bar 14. The hook 16 is rotatably mounted on bar 14 and includes a thin flexible finger 18. Member 12 is composed of a base 20 having a uniform cross-section, and two arms 22, 24. Under load, these arms tend to bend outwardly in the direction shown by arrows A, B thereby, separating from the pins such as 26 holding the bar 14. As a result the bar 14 and hook 16 spring out and separate from the member 12. A further problem with the prior art swivel hook is that the web tends to bunch up at the corners such as 28.

The improved universal swivel hook assembly 50 shown in FIGS. 2-7 includes three members: a U-shaped member 52, a bar 54, and a hook 56.

U-shaped member 52 includes a base 58 and two opposed arms 60, 62. As shown more clearly in FIG. 5, base 58 does not have a uniform cross-section but rather it has a thickness D in a central area disposed opposite hook 54 which is larger or thicker than the thickness d at the ends of the base as shown.

Each of the two arms 60, 62 is formed with a triangular stop 64, 66. Each stop has a surface 68, 70 facing the concave surface 72 of base 58. Each arm terminates in hole 74, 76. These two holes are aligned co-axially. The triangular stops 54, 66 have two purposes. They keep a web passing over surface 72 running smoothly, without bunching up. Moreover, while member 52 is cooling after it has been molded, the material of the stop causes the arms 60, 62 to shrink innards toward each other thereby insuring a better seating of bar 54.

Figure 3:
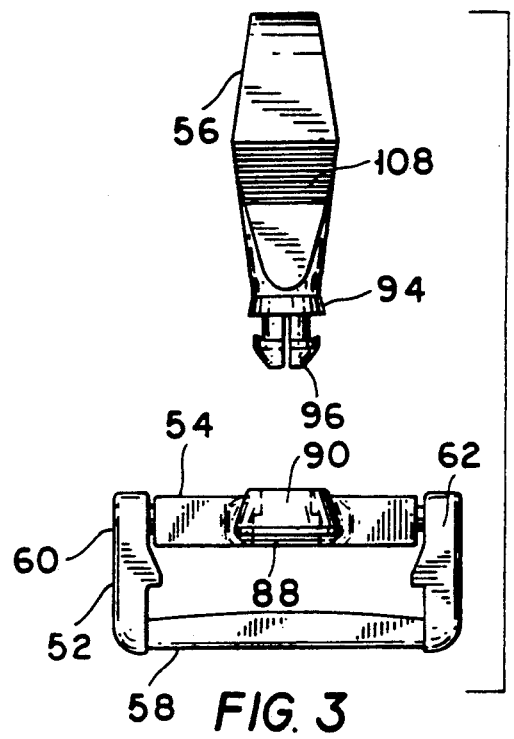
FIG. 3 shows a front view of the assembly of FIG. 2 with the hook separated.
Figure 2:
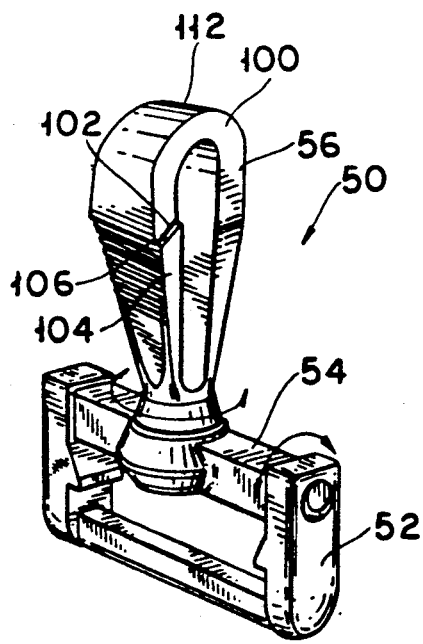
FIG. 2 shows a perspective view of an improved swivel hook constructed in accordance with this invention.

Bar 54 is terminated with two pins 78, 80 journaled in holes 74, 76 respectively. Bar 54 has a substantially rectangular cross section except in its center. In the center, bar 54 is formed with a barrel shaped region 80 defined by two frustoconical surfaces 82, 84. These surfaces 82, 84 are joined by a rim 86 having a diameter larger than the diameters of surfaces 82, 84. Bar 54 is also provided with a throughhole 88 formed concentrically with the region 80. Preferably hole 88 has a narrowed portion 90 at the top of bar 54, as shown in FIG. 3.

Figure 4:
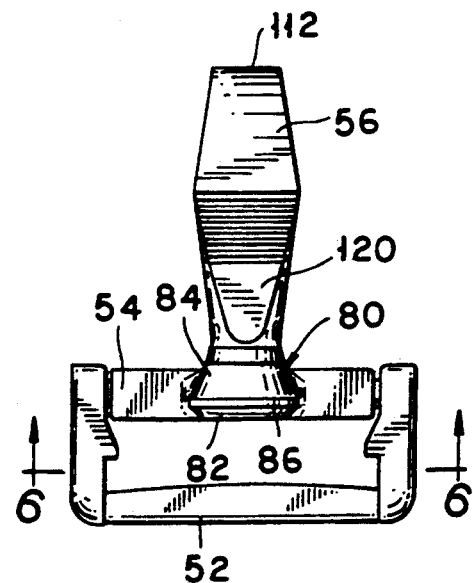
FIG. 4 shows a front view of the improved swivel hook assembly of FIG. 2.
Figure 5:
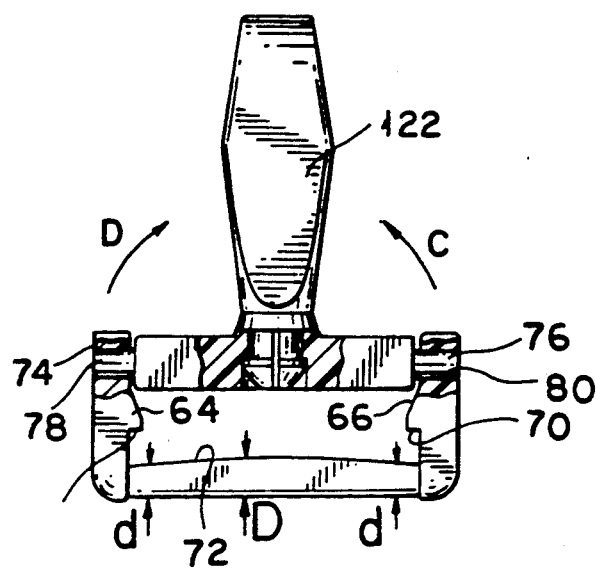
FIG. 5 shows a partial sectional back view of the improved swivel hook assembly of FIG. 2.
Figure 6:
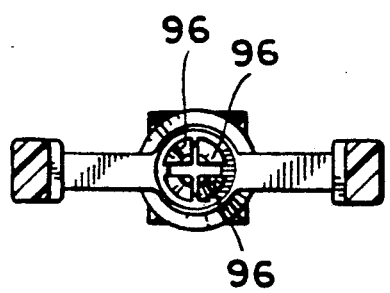
FIG. 6 shows a sectional view of the improved swivel hook assembly taken along line 66 in FIG. 4.

Hook 56 is formed of a disk-shaped base 94. Four prongs 96 are attached to the base and extend downwardly. Each prong 96 is formed with a shoulder 98 spaced from base 94 at a distance equal to the depth of narrowed section 90 of hole 88. A J-shaped member 100 rises upward from base and after curving back downward, it terminates in a slanted surface 102. An arm 104 extends upwardly at a slight angle and it terminates in a surface 106 normally parallel with and contacting surface 102. As shown in FIGS. 4 and 5, as they rise, both member 100 and arm 104 taper outwardly so that they are widest at an area just below the surfaces 102, 106. Int his area, arm 104 is provided with a plurality of horizontal grooves 108 to form a non-slip surface 120. Above surfaces 102, 106, member 100 is tapered to a narrow apex 112. The width of both member 100 and arm 104 at the bottom corresponds with the width of the base 94 so that the side surfaces of both these elements are continuous with the side surface of the base 94. Prongs 96 are slightly elastic so that they can be inserted into hole 88. In this manner the hook 56 is rotatably captured by bar 54.

Figure 7:
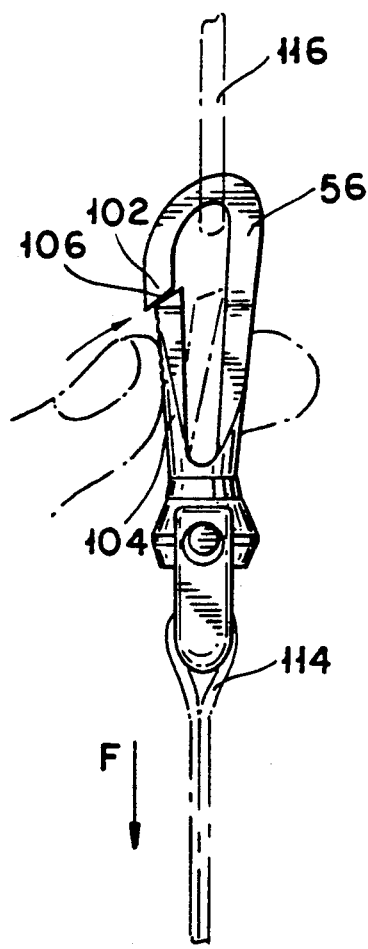
FIG. 7 shows a side view of the improved swivel hook assembly in operation.

The swivel hook is used as follows. A web 114 is trained around 58 and secured in any well known means. The position of the swivel may be adjusted by changing the length of web 114. When the web is to be attached to another member such as a hoop 116, hook is grasped between a forefinger 118 and a thumb 120 as shown in FIG. 7 and arm 106 is flexed to cause the surfaces 102, 106 to separate. The hoop 116 is then inserted into the position shown in FIG. 7. When the arm 104 is released, it springs back with surfaces 102 and 104 cooperating to capture the hoop 116. Once engaged as described above, the universal swivel hook allows the web 114 or hook 116 to swing about an axis passing through pins 78, 80, or to swing about an axis coincident with the axis of hole 88 without any strain on the hook.

As mentioned above, as the web 114 is trained around base 58 of member 52, it does not bunch up and does not come into contact with the bar 54 because of the stops 64, 66. In addition the curved surface 72 insures that a force F downwardly on the hook by web 114 (shown in FIG. 7) will be applied mostly on the highest point of surface 72. This action will cause arms 60, 62 to flex inwardly as shown by arrows D and C in FIG. 5. In addition, the shape of bar 54, and especially the provision of rim 86 insures that when a longitudinal force F is present, bar 54 does not bend upward. These two actions insure that pins 78, 80 do not jump out from holes 74, 76 in the presence of force F, as it happens with the prior art hook shown in FIG. 1. Finally, the flat surfaces 120, 122 on arm 104 and member 100 respectively insure that when the hook 56 is grasped as shown in FIG. 7 it rests comfortably and securely between the figures. The prior art hook 16 shown in FIG. 1 is uncomfortable to hold and has a tendency to twist when finger 18 is pressed.

Obviously numerous modifications can be made to the invention without departing from its scope as defined in appended claims.

I claim:

1. A swivel hook assembly comprising:
   web engaging means for engaging a flat web, said web engaging means including a first elongated member for entrained by said web, said elongated member being bowed outwardly in an area corresponding to the center of said web, said web engaging means having a pair of separated arms extending therefrom;
   hook means; and
   coupling means pivotally attaching said hook means to said web engaging means the bowed elongated member tends to pivot said separated arms preventing the web engaging means from separating from the coupling means when the swivel hook is under a load.

2. The assembly of claim 1 wherein said web engaging means includes a second elongated member parallel to said first elongated member, said second elongated member having an enlarged center means for resisting bowing in response to a force applied by said web, said hook means being captured by said enlarged center means.

3. The assembly of claim 1 wherein said hook comprises a base coupled to said web engaging means, and first and second hook members extending away from said base and constructed and arranged to selectively capture a hoop, said first and second hook members having opposed flat surface for grasping between the fingers of a user.

4. The assembly of claim 1 wherein said web engaging means includes two arms, each arm having one end connected to said first elongated member and stop means having a flat bottom surface disposed on said arms and facing each other for limiting the longitudinal movement of said web.

5. A swivel hook assembly comprising:
   web engaging means including a web base for entraining a web, two separated arms connected at one end to said web base, and a bar extending between said arms, said web base having an enlarged center with respect to the ends of said web base arranged and constructed to resist a longitudinal force against said separated arms for preventing the separation of said web engaging means;
   hook means for selective coupling to a hoop; and
   pivoting means for pivotally attaching said hook means to said web engaging means.

6. The assembly of claim 5 wherein said arms are provided with stop mean shaving flat bottom surfaces for limiting the longitudinal movement of a web trained around said web base.

7. The assembly of claim 5 wherein said hook means includes a base, and two members extending away from said base and cooperating to selectively entrap said hoop, said members having outside flat surfaces for grasping.

8. The assembly of claim 7 wherein said two members have contacting surfaces.

9. The assembly of claim 7 wherein one said members is a J-shaped member ending a first hook surface, and said second member has a second hook surface biased against said first hook surface.

10. A universal swivel assembly comprising:
    a U-shaped member comprising an elongated base having a bowed center and two arms extending from said base;
    a bar pivotally coupled on said arms and having an enlarged bar center, said bar and elongated base being constructed and arranged to resist the separation of said arms from said bar due to a longitudinal force; and
    a hook rotatably coupled to said bar center; wherein said arms have inner surfaces with stops having a flat bottom surface for limiting the longitudinal movement of a web trained around said elongated base.

11. The assembly of claim 10 wherein said arms are terminated with mounting holes, and said bar has pins disposed in said mounting holes.

12. The assembly of claim 12 wherein said bar center comprises an opening and said hook has a hook base, and a plurality of prongs extending in a first direction and attached to said hook base, said prongs being entrapped in said opening.

13. The assembly of claim 12 wherein said hook further comprises a first and second hook members said, hook members extending from said hook based in a second direction opposed to said first direction, said members cooperating to selectively engage a hoop.

14. The assembly of claim 13 wherein said hook members have flat grasping surfaces for grasping said hook.

15. The assembly of claim 13 wherein said hook base has a cylindrical side surface, and said hook members have outer surfaces continuous with said side surface.

16. The assembly of claim 10 wherein said bar center is defined by two opposed frustoconical surfaces and a cylindrical ring disposed therebetween.

* * * * *